R. A. & G. JOHNSON.
VALVELESS FOUR-CYCLE ENGINE.
APPLICATION FILED AUG. 28, 1912.

1,224,468.

Patented May 1, 1917.
3 SHEETS—SHEET 1.

Witnesses:
Floyd O. Chaffee
Edmund Spaeth

Inventors
R. A. Johnson
G. Johnson
by
Attys

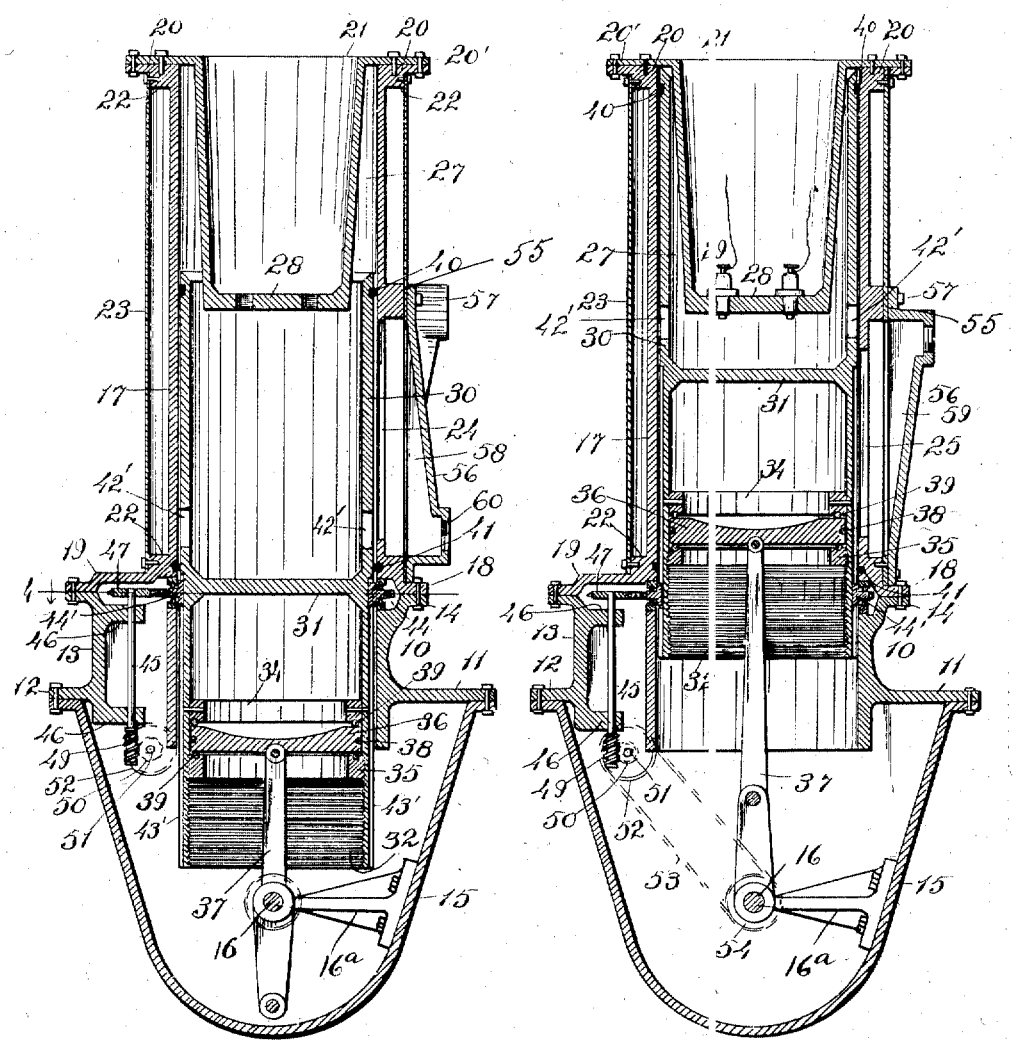

R. A. & G. JOHNSON.
VALVELESS FOUR-CYCLE ENGINE.
APPLICATION FILED AUG. 28, 1912.
1,224,468.
Patented May 1, 1917.
3 SHEETS—SHEET 3.
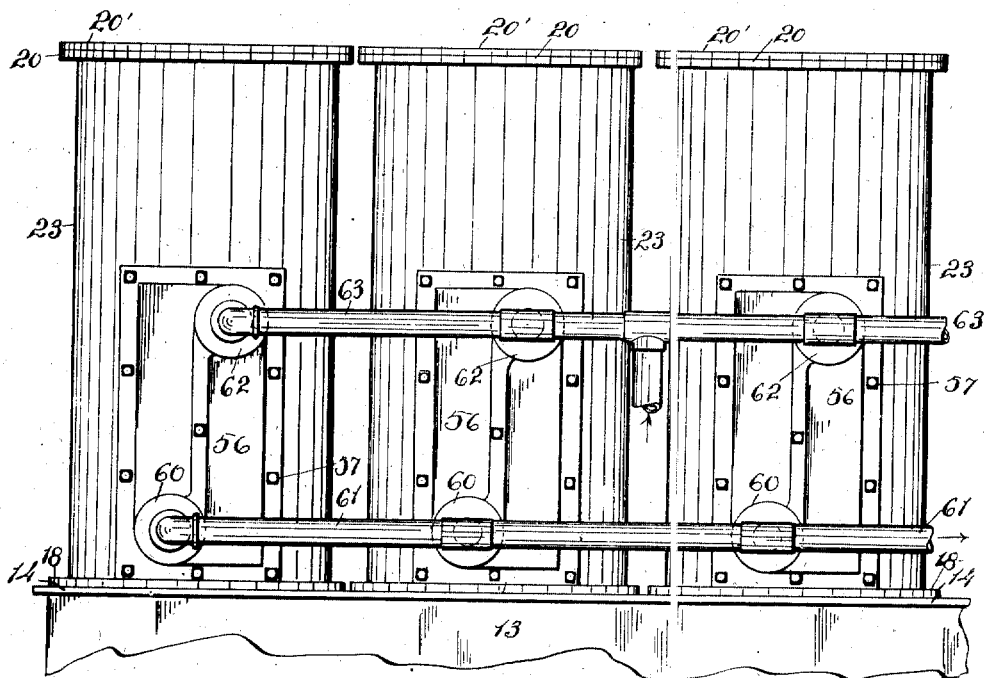
Fig. 5.
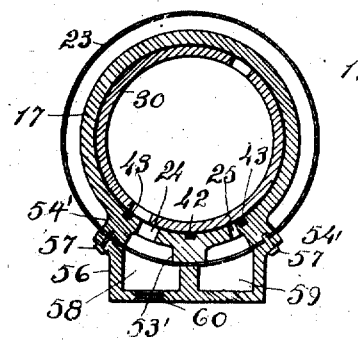
Fig. 6.
Fig. 7.
Fig. 8.
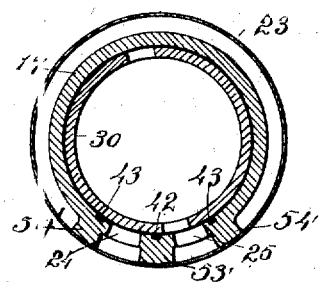
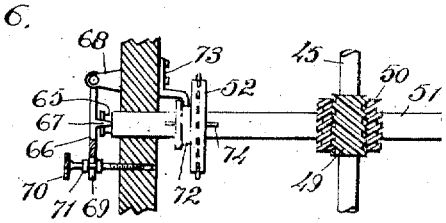
Fig. 9.
Witnesses:
Floyd O. Chaffee,
Edmund Harold
Inventor
R. A. Johnson
G. Johnson
By
Atty.

UNITED STATES PATENT OFFICE.

ROLLY A. JOHNSON AND GARFIELD JOHNSON, OF LOS ANGELES, CALIFORNIA, ASSIGNORS OF ONE-SIXTH TO HOWARD M. HUNTER, OF LOS ANGELES, CALIFORNIA, ONE-SIXTH TO C. F. GOUDY, ONE-SIXTH TO FRANK SPARKS, AND ONE-SIXTH TO F. C. HOFFER.

VALVELESS FOUR-CYCLE ENGINE.

1,224,468.  Specification of Letters Patent.  Patented May 1, 1917.

Application filed August 28, 1912. Serial No. 717,511.

*To all whom it may concern:*

Be it known that we, ROLLY A. JOHNSON and GARFIELD JOHNSON, both citizens of the United States, residing at Los Angeles, in the county of Los Angeles and State of California, have invented certain new and useful Improvements in Valveless Four-Cycle Engines; and we do hereby declare the following to be a full, clear, and exact description of the invention, such as will enable other skilled in the art to which it appertains to make and use the same.

Our invention relates to explosion engines and more particularly to engines known as the four-cycle type and the object thereof is to dispense with valves in the operation of the engine by means of which the construction is simplified and its operation rendered more effective.

The prime feature of our invention resides in the construction and operation of the piston and its relation with the cylinder, the piston being revoluble during its reciprocating motion and so arranged that the exhaust is continuous during the upstroke and whereby the inspiration period commences immediately and continues during its entire downward stroke, the exhaust and supply ports being so constructed in the piston that a perfect compression is provided preparatory to the explosion, as will now be set forth in detail.

In the accompanying drawings:

Fig. 2 is a vertical cross section on the line 2—2 of Fig. 1.

Fig. 3 is a similar view to Fig. 2 on the line 3—3 of Fig. 1.

Fig. 4 is a horizontal section on the line 4—4 of Fig. 2.

Fig. 5 is a side elevation of one of the cylinders showing the application of the manifolds.

Fig. 6 is a horizontal section of one of the cylinders on the line 6—6 of Fig. 1.

Fig. 7 is a horizontal section of one of the cylinders on the line 7—7 of Fig. 1.

Fig. 8 is a horizontal section of one of the cylinders on the line 8—8 of Fig. 1.

Fig. 9 is an enlarged detached portion of the advancing mechanism.

Figure 1:
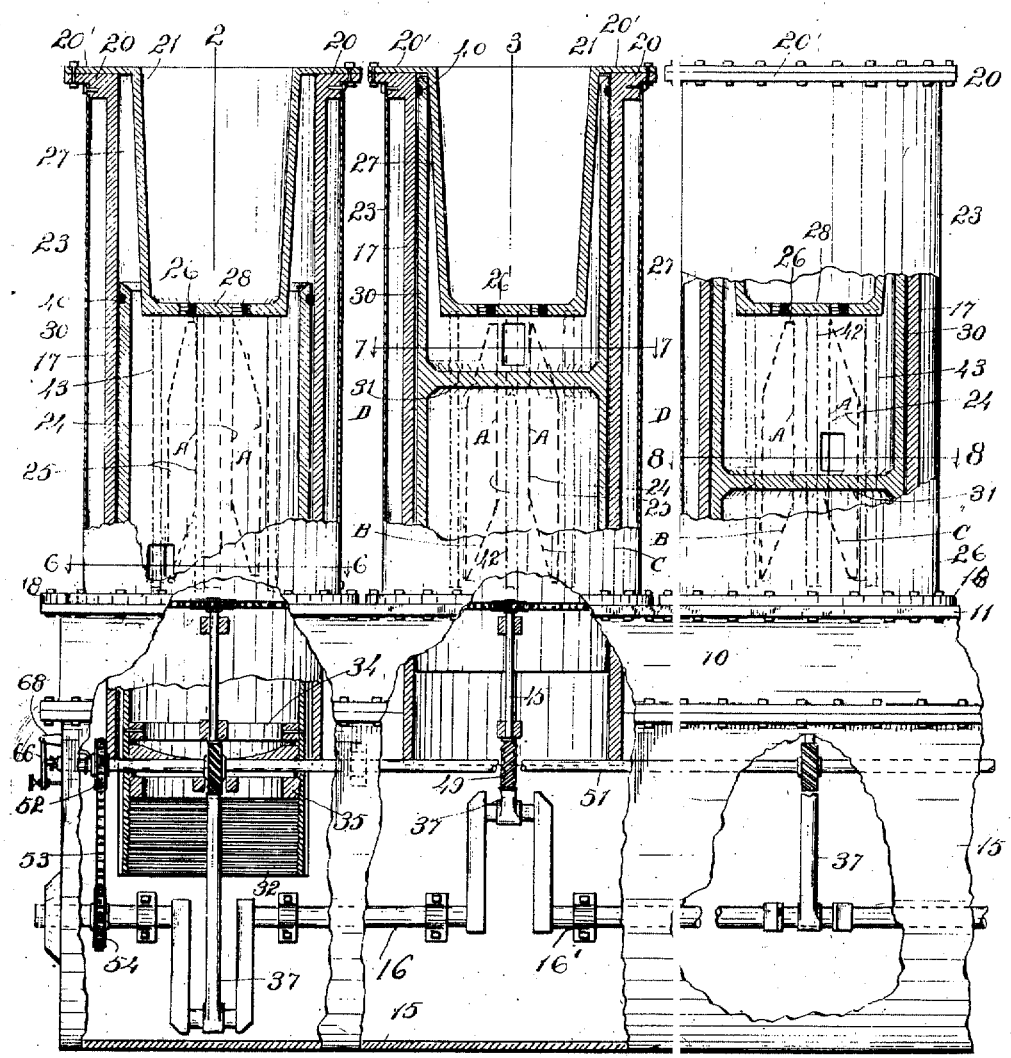
Figure 1 is a side elevation, partly in section, of a portion of an explosion engine of our improved type.

In constructing our invention we prepare a base 10, adapted to receive thereon the cylinders, this base being provided at its front side with a horizontal flange 11 and along its rear side with a flange 12, and a housing 13.

Base 10 has circular flanges 14 to receive the explosion cylinders, and a crank case 15 is secured to the lower side of base 10. A crank shaft 16 extends transversely through crank case 15 and is revolubly mounted in the ends thereof and is also supported intermediate the ends by bearings 16' mounted upon the sides of said case. Each cylinder 17 has a flanged base 18 and an extension flange 19 at its rear side to cover the housing, and the upper end of each cylinder has also one annular flange 20 to provide a means whereby the cap or head 21 may be bolted thereto. An annular rib or boss 22 is cast integral with the cylinder at each end to provide seats for the water jacket 23 which surrounds the cylinder. Through the front wall of each cylinder we form a pair of vertically disposed parallel openings or ports 24 and 25, these ports being narrow and extending along the cylinder a distance equal substantially to the stroke of the piston. By reference to Fig. 1 it will be seen that these ports, shown by dotted lines, are pointed at their upper and lower ends. The inner walls A are parallel with each other throughout except at their lower ends where the walls diverge as at B and C. The diverging wall B joins the outer wall D of the opening 25 and extends upward to approximately two-thirds of the length of the port, where it converges toward and joins the inner wall A. The other port is similarly constructed, with the exception that the converging and diverging walls of the two ports are in opposite directions. It should also be noted that while the upper end of the port 24 and the lower end of the port 25 terminate in points the upper end of the port 25 and the lower end of port 24 each terminate at a wall 26, so as to give a greater width to the terminals of the opposite ends of these ports, as will be explained hereafter. The top or cap of each cylinder comprises a cup-shaped shell 21 with its flange 20', and the body of this cap extends down into the cylinder 17, its diameter being such that an annular channel 27 is formed between the cap and cylinder; and in the bottom 28 of this cap we place the spark plugs 29 as best shown in Fig. 3. The piston comprises a shell 30, and has a horizontal partition 31 midway between its ends. The lower end of this shell is threaded interiorly, as at 32, and midway between the lower end of the shell and the partition 31 is a ring 34 fitted within and secured to the piston shell. A threaded ring 35 is adapted to screw into the threaded portion of the shell, and between the two rings 34 and 35 is a disk 36 to which the connecting rod 37 is attached. The edge of this disk 36 has ball bearings 38, and above and below the disk are also anti-friction balls 39 bearing against the rings 34 and 35 so that, while the disk is not revoluble the anti-friction thus described provides a means whereby the piston may revolve. The upper end of the piston is also open and is designed to operate within the annular channel 27 formed between the depressed cap 21 and the cylinder walls 17. The upper end of the piston has exteriorly thereof a groove to receive therein a snap ring 40 for packing the upper end of the piston, and a similar ring 41 is provided in a groove interiorly of the lower end of the cylinder below the vertical ports 24 and 25. Vertical packing strips 42 and 43 are also provided in suitable grooves in the cylinder, one of the strips 42 being between the ports, and the other strips outside of and adjacent the ports. These packing strips extend up to a position just below the location of the snap ring 40, when the piston is at its lowest point. The piston has two ports 42' oppositely located at a point directly above the partition wall 31, so that they overlap the ends of the vertical ports 24 when the piston reaches the end of its stroke in either direction. The piston has two vertically disposed grooves 43' extending from the lower end to a point midway between the ends of the piston, and a sprocket toothed rim 44', provided with splines to engage with the grooves, is fitted over the piston so that it is longitudinally movable. The rim is held in place by means of a recess 44 (Fig. 2) formed between the joining part of the casing and base so that while the rim turns with the piston it does not move longitudinally during the reciprocation of the piston. Within the housing 13 of the base and at each cylinder is a short vertical shaft 45 secured in suitable bearings 46, preferably cast integral with the base. The upper end of each shaft 45 carries a sprocket wheel 47, which is in line with the sprocket-toothed rim 44' on the piston, and a sprocket chain 48 around the wheel and rim provides a means for imparting rotary motion from the shaft to the piston. The lower end of each shaft has a worm 49 which meshes with a worm wheel 50 on a horizontal shaft 51, this shaft being parallel with the crank shaft, and mounted in suitable bearings in the crank case. At the end of this shaft 51 is a sprocket wheel 52 carrying a sprocket chain 53 which communicates with a similar sprocket wheel 54 on one end of the crank shaft 15 so that motion is transmitted from the crank shaft to the vertical shafts and from these vertical shafts to the individual pistons through the chains 48. The relation of the gearing between the crank shaft and the pistons is such that at each revolution of the crank shaft the piston makes a quarter revolution, and the object of the two ports 42' of the piston is to obviate the necessity of making too rapid turn of the piston during its reciprocation. It will be noticed that the front of each cylinder has integral therewith three parallel longitudinally disposed ribs 53', 54' which extend out and are flush with the lower annular rib 22 of the cylinder, the intermediate rib 53' being between the vertical ports 24 and 25 and the other two ribs 54' being on opposite sides of the ports and parallel therewith. A cross rib 55, also integral with the cylinder connects the upper ends of these vertical ribs.

In practice the thin metal jacket 23 is placed around the cylinder and the openings between these ribs 53', 54', 55' cut away and we then bolt a plate 56 to the base thus formed, by bolts 57. This plate is provided with an interior longitudinal wall which is parallel with and rests above the intermediate rib 53' of the cylinder, thus forming two channels 58 and 59, the channel 58 thereby communicating with the port 24 and the channel 59 with the port 25. The channel 58 has a boss 60 at its lower end threaded to receive the manifold pipe 61, and the other channel 59 has a boss 62 to receive the manifold pipe 63.

In order to readily understand the operation of the engine thus constructed reference is had to Fig. 2 which shows the piston at the lowest point after an explosion has taken place with one of the piston ports 42' communicating with the lower end of the cylinder port 24. During the entire upstroke of the piston port 42' discharges the burnt gases through the vertical port 24, and into the channel 58 which communicates with the exhaust manifold 61. When the piston has reached its highest limit the port 42' is in position directly behind the rib between the intermediate ports 24 and 25, and as the piston commences the downward movement its revoluble motion brings the port 42' in communication with the cylinder port 25, thus commencing the inspiration period of the cycle. As the piston reaches its lowest limit the port 42' recedes from port 25 due to its revoluble motion so that when the next upward stroke of the piston takes place the port 42' has passed the packing strips 43, and the other companion port 42' does not again appear at the bottom of the cylinder port 24 until the completion of the combustion stroke. The revoluble vertical motion of the piston during its up and down movement also has a tendency to prevent the piston freezing to the walls of the cylinder and also eases the piston in its up and down travel as by this combined movement the outer wall of the piston will describe or travel in a longitudinal spiral path upon the inner wall of the cylinder. It will also be observed that all the gearing to produce the revoluble motion is located within the crank case and housing provided so that every part of the working mechanism is inclosed. It is obvious that the compression spaces may be enlarged or decreased by changing the position of the disks 36, to which the connecting rods 37 are hinged. In order to provide a means for advancing or retarding the revoluble piston relative to its vertical position, one projecting end of the shaft 51 has an annular groove 65, and a lever 66 with a yoke 67 in engagement with the groove 65, has one end hinged to a bracket 68, while its other end has a slot 69 to receive a threaded stem 70. This stem has a collar 71 on each side of the lever 66 so that by turning the stem 70 the shaft 51 is moved longitudinally. To keep the sprocket wheel 52 in alinement with the sprocket wheel 54 on the crank shaft, the hub of the wheel 52 has an annular groove 72 and a finger in this groove projecting from bracket 73 keeps the wheel from moving on the shaft and a feather 74 on the shaft engaging with a groove (not shown) in the sprocket wheel 52 fixes the wheel revolubly with the shaft. When the shaft 51 is moved longitudinally the effect will be to turn the shaft 45, through the worm and worm wheel 50 and 49 and the shaft 45 will in turn cause the piston to move through the sprocket wheel 47, and chain 48.

Having described our invention what we claim is:

1. In an explosion engine, a cylinder provided with an inlet and a discharge port extending longitudinally in the walls thereof and opening into said cylinder a distance approximately equal to the piston stroke; and a reciprocating and revoluble piston therein, said piston having a port through the wall thereof adapted to register with one or the other of said inlet and discharge ports at predetermined times.

2. In an explosion engine a crank shaft; a cylinder; a piston having at its lower end exterior vertical grooves; a sprocket toothed rim on said piston provided with splines to slide in the grooves of the piston; a vertical shaft carrying at its upper end a sprocket wheel; a chain from said wheel to the sprocket toothed rim around the piston; a worm at the lower end of the shaft; a horizontal shaft carrying a worm wheel engaging with the worm; a sprocket wheel on the horizontal shaft; and a chain connecting said wheels whereby the piston may be revolved during the rotating of the crank shaft.

3. In an explosion engine a base; a cylinder provided with suitable inlet and outlet ports; a piston in said cylinder; a crank shaft and connecting rod, the lower end of said piston having exterior longitudinal grooves, a sprocket toothed rim having splines in engagement with the grooves and held in a suitable recess in said base; a vertical shaft having a sprocket wheel; a sprocket chain connecting said wheel and said toothed rim; the lower end of said vertical shaft being geared to the crank shaft.

4. In an explosion engine a cylinder having in the inner wall thereof a pair of parallel channels extending longitudinally a distance equal to the stroke of the piston; a piston having a pair of oppositely disposed ports therethrough, said piston being revoluble and the ports so disposed relatively to each other that during the exhaust stroke one of the piston ports registers with one of the channels of the cylinder and with the other channel during the intake stroke, and during the compression and power strokes said ports are out of register and during the next exhaust stroke the other port of the piston registers with the first named channel of the cylinder and at the intake stroke with the second named channel.

5. In an explosion engine a cylinder having vertical parallel ports in one side thereof, one being the inlet and the other the outlet port; ribs extending around and intermediate said ports, integral with the cylinder; and a plate overlapping said ports and secured to the aforesaid ribs, the plate having channels which register with the vertical ports of the cylinder; and means for attaching manifolds thereto.

6. In an explosion engine a cylinder; a pair of ports in said cylinder; a piston in said cylinder having oppositely disposed ports; a crank shaft; a connecting rod between said piston and crank shaft; means operated from the crank shaft for revolving the piston a quarter turn horizontally at each complete turn of the crank shaft; and means to cause the ports in the piston to communicate with the cylinder ports at each alternate revolution of the crank shaft.

7. In a four cycle engine a cylinder provided with inlet and outlet ports in the walls thereof; parallel longitudinally extending channels in the inner wall of said cylinder, one of said channels communicating at one end with said inlet port and the other of said channels communicating with said outlet port; a piston in said cylinder comprising a hollow shell provided with ports in the wall thereof adapted to register with the channels in the cylinder at predetermined times; a crank shaft; a connecting rod connecting said shaft and said piston; and means operated from the crank shaft to rotate said piston horizontally.

8. In an explosion engine a cylinder provided in its side walls with a pair of grooves; a supply and exhaust port at the end of said grooves, there being an exhaust port at one end of one of said grooves and a supply port at the opposite end of the other of said grooves, said grooves being longitudinally disposed parallel with each other; each of said grooves being of less width at the ends opposite the ports; a piston having oppositely disposed ports therein slidably and revolubly mounted in said cylinder; a crank shaft; a connection between said cylinder and said crank shaft; and means connected to the crank shaft to revolve said piston to bring the ports therein into register with the grooves in the cylinder at predetermined times.

9. In an explosion engine a cylinder having in its side wall a pair of longitudinally extending channels; one channel communicating at one end with a supply manifold and the other channel at the opposite end with an exhaust manifold, said channels being of a length equal to the stroke of the piston and each channel having its end opposite the communicating end narrowed in width; a piston within said cylinder having a port therein adapted to be brought into register with first one and then the other of the channels in the cylinder wall; a crank shaft; a connecting rod between said piston and shaft; and means connected to said shaft and piston to rotate said piston to bring the port therein into register with the channels in the cylinder at predetermined times.

10. In an explosion engine, a cylinder provided in its side wall with a pair of grooves having a supply and an exhaust port communicating therewith, said grooves being longitudinally disposed, parallel with each other and spaced apart, the upper ends of the grooves having their outer walls inclined toward each other to form narrow terminal openings, and the lower ends of the grooves having their inner walls inclined away from each other to form narrow terminal openings; and a revoluble piston having a port therein which communicates first with one and then with the other of the grooves in the cylinder wall.

11. In an explosion engine a base; a plurality of cylinders provided with suitable inlet and outlet ports mounted on said base; a piston in each of said cylinders provided at its lower end with exterior longitudinal grooves; a connecting rod for each of said pistons; a crank shaft; a sprocket toothed rim for each piston having splines in engagement with the grooves therein and held in a suitable recess in said base; a vertically extending shaft having a sprocket wheel mounted thereon mounted in said base; a sprocket chain connecting said sprocket wheel and the toothed rim of each piston; and an operative connection from said vertical shaft to the crank shaft.

12. In an explosion engine a plurality of cylinders each having in the inner walls thereof a pair of parallel channels extending longitudinally a distance equal to the stroke of the piston; a piston having a pair of oppositely disposed ports therethrough in each of said cylinders, said pistons being revoluble and the ports of each piston so disposed relatively to each other that during the exhaust stroke one of the piston ports registers with one of the channels of the cylinder and with the other channel during the intake stroke and during the compression and power strokes said ports are out of register, and during the next exhaust stroke the other port of the piston registers with the first named channel of the cylinder and at the intake stroke with the second named channel.

13. The combination with an engine cylinder having suitable ports, of a rotatable piston reciprocating in the cylinder and adapted to open and close the ports thereof by its own rotation, and an endless chain arranged to rotate the piston, always in the same direction, while the latter reciprocates.

14. The combination with an engine cylinder having suitable ports, of a rotatable ring at the open end of the cylinder adapted to be peripherally engaged by an actuating chain, a rotatable piston reciprocating in said cylinder and ring and in sliding engagement with the latter, and an endless chain engaging the ring and imparting continued rotation thereto.

15. The combination with an engine cylinder having suitable ports, of a rotatable piston reciprocating in the cylinder and adapted to open and close the ports thereof by its rotation; an endless chain arranged to rotate the piston, always in the same direction, while the latter reciprocates; and means to adjust the relative horizontal position of said ports and piston.

16. In an explosion engine a cylinder provided with an inlet and a discharge port extending longitudinally in the walls thereof and opening into said cylinder a distance approximately equal to the piston stroke; a reciprocating and revoluble piston therein, said piston having a port through the wall thereof adapted to register with one or the other of said inlet and discharge ports at predetermined times; and manually operated means to advance or retard the rotative engagement of the piston ports with the cylinder ports.

17. In an explosion engine a cylinder; a pair of ports in said cylinder; a piston in said cylinder having oppositely disposed ports; a crank shaft; a connecting rod between said piston and crank shaft; means operated from the crank shaft for revolving the piston a quarter turn horizontally at each complete turn of the crank shaft; means to cause the ports in the piston to communicate with the cylinder ports at each alternate revolution of the crank shaft; and means to advance or retard the time of communication between said piston and cylinder ports substantially as described.

18. The combination with an engine cylinder having suitable ports of a rotatable piston reciprocating in the cylinder and adapted to open and close the ports thereof by its rotation; an endless chain arranged to rotate the piston, always in the same direction, while the latter reciprocates; and means to advance or retard the rotation of said piston whereby the opening or closing of said ports is advanced or retarded.

Signed at the city of Los Angeles, county of Los Angeles, State of California, this 15th day of March, 1912, in the presence of witnesses.

ROLLY A. JOHNSON.
GARFIELD JOHNSON.

Witnesses:
DAISY BOWEN LEE,
J. S. ZERBE.